March 30, 1954
C. A. SIRINGO
2,673,926
ATTACHMENT FOR PARKING LIGHTS
Filed Sept. 10, 1952
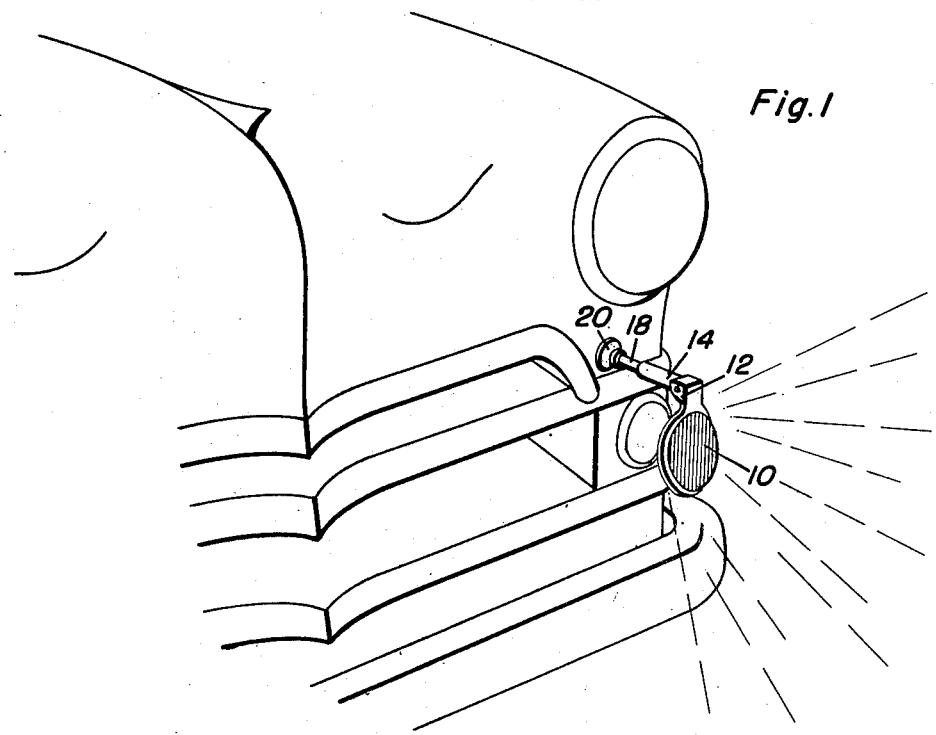
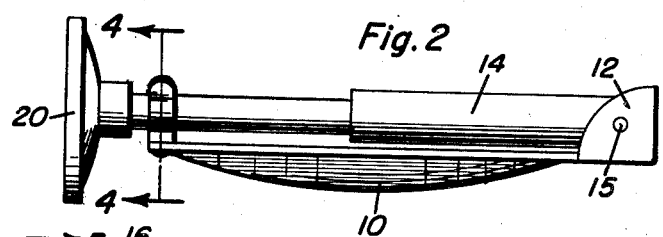
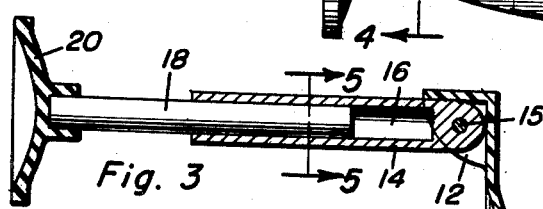
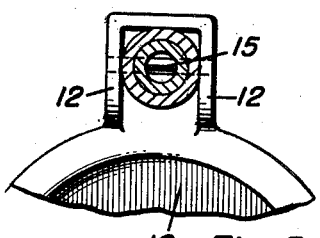
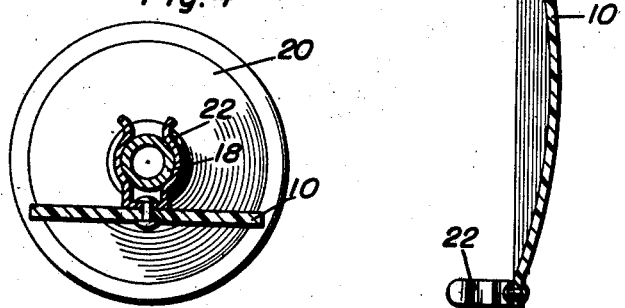
Carmen A. Siringo
INVENTOR.

Patented Mar. 30, 1954

2,673,926

UNITED STATES PATENT OFFICE 2,673,926

ATTACHMENT FOR PARKING LIGHTS

Carmen A. Siringo, Utica, N. Y.

Application September 10, 1952, Serial No. 308,851

1 Claim. (Cl. 240—46.23)

This invention relates to an improved device for use on motor vehicles, particularly for use with a conventional parking light as provided on such motor vehicles.

An object of my invention is the provision of a reflecting device in the form of an elliptical plastic body which can be positioned and supported in front of a parking, or signal light, to reflect a red glow when such light is burning.

Another object of the invention is the providing of a reflecting device for parking lights that is adapted for being quickly and conveniently attached to a part of the surface of a vehicle adjacent and around such light without the use of screws, bolts, or the like, and to be likewise easily detached from such surface.

A further object of this invention is to provide a device as described that includes but a few parts, simple in its construction and quite inexpensive to produce.

Other objects and advantages of the invention will appear in the following specifications.

A preferred structure and form of the invention is shown in the drawings, in which:

Figure 1 is a perspective view showing the device comprising the present invention as operatively installed on an automotive vehicle;

Figure 2 is an enlarged side elevational view of the device shown in a closed position;

Figure 3 is an enlarged sectional detail view illustrating the construction of the invention in greatest detail with the elliptical lens being shown in an opened position;

Figure 4 is a sectional detail view as taken along the plane of line 4—4 in Figure 2; and Figure 5 is a sectional view as taken along the plane of line 5—5 in Figure 3.

With continuing reference to the accompanying drawings, wherein like reference numerals designate similar parts throughout the various views, the numeral 10 generally indicates an elliptical lens made of red colored plastic and of a thickness shown and having a curved convex surface. Extending rearwardly from the upper end of the body and in parallel spaced relation are two ear-like projections 12 which are integral with the body, such portions providing means whereby one end of part 14 of a cylindrical telescoping arm consisting of two parts, is removably connected between the ear-like portions 12 as a support for the lens 10. A pin 15 is utilized to provide a pivotal connection between the part 14 and the ears 12.

The part 14 is recessed as at 16 for reception of an arm part 18 slidable within the recess 16 providing a means to shorten or lengthen the cylindrical arm to adjust the lens 10 to position it at a required distance from the parking light in order to provide a reflecting means for such light. The outer or free end of the part 18 has a vacuum or suction cup 20 affixed thereon to provide a removable attachment means for supporting the said arm and body in proper position in relation to the parking light.

The body 10 may be folded up against the arm parts 14 and 18, if so desired, and retained in such position by means of a prong-like element 22 affixed to the rear surface of the lower end portion of the body and which engages the arm part 18.

In the use and operation of the invention, it will be understood that it is removably attached to the surface of the body of a motor vehicle in such a position that the body will depend along its longer diameter in front of and cover a parking light so, that when such light is burning, the body being of red plastic, will reflect or show a red glow. Also when so positioned in front of a signal light, it will likewise flash red "on" and "off" as a warning to approaching motorists to exercise care.

Furthermore, as shown and described, the telescoping feature of the cylindrical arm permits the adjustment of the body to any desired or required position from a parking, or signal light.

As previously specified, the device is easily and quickly attached to, or detached from, the surface of a motor vehicle by means of the vacuum or suction cup. The device being also adapted to be folded together, when not in use, convenient for storing.

While I have shown my invention in a preferred form, minor changes may be made as required in use without departing from the spirit of the invention.

What is claimed is:

A light transmitting device comprising an elliptical body of red colored light transmitting material adapted to be positioned in front of and in alignment with a signal light of a vehicle, said body having attached thereto at the upper portion thereof two rearwardly extending ear-like projections, a prong-like retaining clip attached to the lower portion of said body and extending rearwardly therefrom, a pair of telescoping support arms, the first of said arms being pivotally attached to said ear-like projections between said projections, the second of said arms carrying a suction cup for securing said device to a vehicle, said retaining clip having a recess therein of smaller dimensions at a neck portion thereof than the diameter of said second arm so that said body can be pivoted into a position wherein said retaining clip can resiliently clampingly engage said second arm to hold said body in a raised position out of alignment with the signal light of the vehicle.

CARMEN A. SIRINGO.

References Cited in the file of this patent

UNITED STATES PATENTS

| Number | Name | Date |
|---|---|---|
| 1,006,315 | Toth | Oct. 17, 1911 |
| 2,483,202 | Jackson | Sept. 27, 1949 |

FOREIGN PATENTS

| Number | Country | Date |
|---|---|---|
| 684,424 | France | June 25, 1930 |
| 862,213 | France | Mar. 1, 1941 |